United States Patent [19]
Honkawa

[11] 3,813,168
[45] May 28, 1974

[54] TWO-WAVELENGTH SPECTROPHOTOMETER

[75] Inventor: Tadashi Honkawa, Katsuta, Japan
[73] Assignee: Hitachi, Ltd., Tokyo, Japan
[22] Filed: Mar. 14, 1972
[21] Appl. No.: 234,584

[30] Foreign Application Priority Data
Mar. 19, 1971  Japan.............................. 46-15112

[52] U.S. Cl..................................... 356/97, 356/95
[51] Int. Cl............................................. G01j 3/42
[58] Field of Search............. 23/252 R, 253 R, 259; 356/51, 88, 93–97, 244, 246

[56] References Cited
UNITED STATES PATENTS

| | | | |
|---|---|---|---|
| 3,279,308 | 10/1966 | Bartz et al. | 356/51 |
| 3,523,737 | 8/1970 | Wood et al. | 356/246 X |
| 3,575,692 | 4/1971 | Gilford | 23/253 R |
| 3,666,362 | 5/1972 | Chance | 356/88 |

Primary Examiner—Ronald L. Wibert
Assistant Examiner—F. L. Evans
Attorney, Agent, or Firm—Craig and Antonelli

[57] ABSTRACT

A plurality of test tubes containing specimens are passed successively through a predetermined position. Two monochromatic beams are transmitted alternately along a single path through said predetermined position and through each of the test tubes passing through said predetermined position. The characteristics of the two beams are such that one of them is capable of being absorbed by the specimen and the other substantially incapable of being absorbed. Thus it is possible to obtain an electric signal representing the ratio or difference between electric signals corresponding to said two monochromatic beams.

10 Claims, 8 Drawing Figures

TWO-WAVELENGTH SPECTROPHOTOMETER

BACKGROUND OF THE INVENTION

1. Field of the Invention

This invention relates to a two-wavelength spectrophotometer, and more particularly to a two-wavelength spectrophotometer which permits high-efficiency and high-accuracy measurement.

2. Description of the Prior Art

In clinical examinations, it is necessary to analyze a large number of specimens in test tubes with high efficiency, and it is considered that the spectrophotometer provides a possible analyzing or measuring instrument to achieve such a purpose. Usually, different test tubes have different scratches, smears and uneven surfaces, and these must not adversely affect the measurements.

Regardless of whether the single-beam type or double-beam type is involved, the prior art spectrophotometer which permits the measurement of specimens in test tubes are classified into two types; one is such that a specimen cell is positioned manually at a predetermined point at each time of examination, and the other uses a plurality of cell holders each supporting a plurality of specimens, which cell holders are intermittently driven to transport the specimens to a predetermined position one by one and hold each cell stationary at such a position for a certain period of time to perform an examination.

Both of the above-mentioned types of conventional instruments have a common disadvantage that if a test tube is used as a specimen cell, it is inevitable that unevenness, scratches and smears on the surface of the cell adversely affect the measurement results. Another common disadvantage is a very low measurement efficiency. Even with the latter type of the instrument, it is possible to measure only about 100 specimens per hour. The measurement efficiency may be improved only at the sacrifice of the stability with which the specimen is held at the predetermined position for examination, resulting in a lower reproducibility of the measurement results. The latter type of the conventional instrument also requires a complicated system to intermittently drive the cell holders.

SUMMARY OF THE INVENTION

Accordingly, it is an object of the present invention to provide a two-wavelength spectrophotometer which permits the use of a test tube as a specimen cell.

Another object of the invention is to provide a two-wavelength spectrophotometer in which the measurements are not adversely affected by any unevenesses, scratches or smears on the surface of the test tubes used as specimen cells.

Still another object of the invention is to provide a two-wavelength spectrophotometer which makes possible highly efficient measurement.

In a preferred embodiment of the invention, a plurality of cell holders supporting a plurality of specimen cells each containing a specimen in it are driven continuously along a straight line, so that the specimen cells successively pass a predetermined point. The light from a light source is divided into two beams which are alternately introduced into a single light path covering said predetermined point. These two beams are converted into first and second monochromatic beams respectively having such characteristics that the former is partially absorbed by the specimens while the latter is transmitted substantially in whole through them. The first and second monochromatic beams are alternately passed through each specimen along a single light path. The transmitted light is detected and converted into electrical signals by a photoelectric converter. The resulting two electrical signals are either substracted from or divided by each other.

DESCRIPTION OF THE PREFERRED EMBODIMENTS

Figure 1:
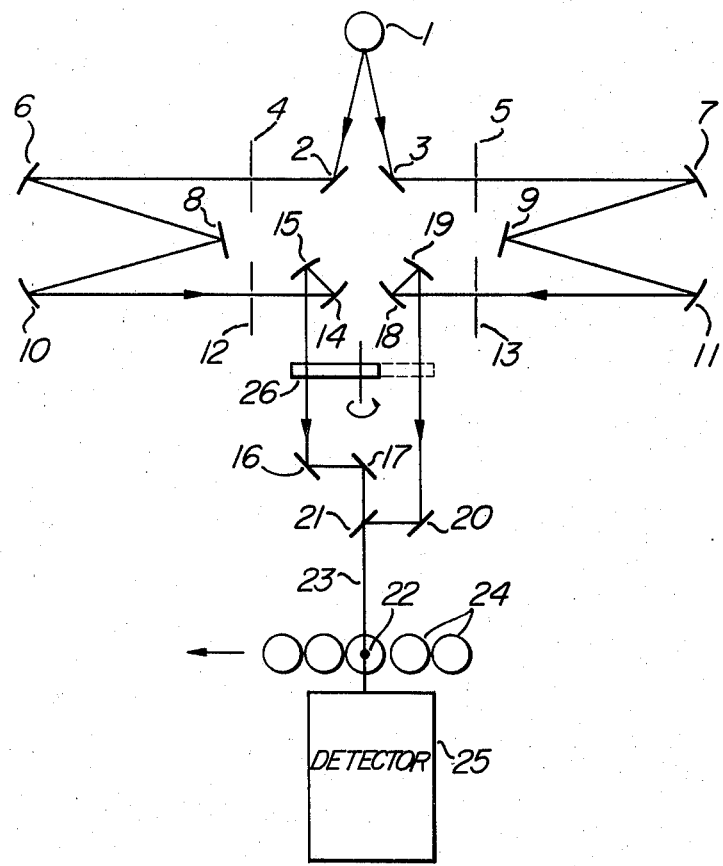
FIG. 1 is a diagram showing an optical system of a two-wavelength spectrophotomer embodying the present invention.

The optical system of the two-wavelength spectrophotometer according to the present invention is shown in FIG. 1. The light from a light source 1 is divided by the mirrors 2 and 3 into two beams, which, through the entrance slits 4 and 5, are introduced to the gratings 8 and 9 in the form of parallel beams by means of the collimating mirrors 6 and 7. The beams are dispersed by the gratings 8 and 9 in accordance with their wavelength so that desired monochromatic beams are obtained from the outlet slits 12 and 13 through the collimating mirrors 10 and 11 respectively. Selection of the wavelength is easily effected by a well-known method utilizing the rotation of the gratings 8 and 9. The monochromatic beam from the outlet slit 12 is introduced through the mirrors 14, 15 and 16 to the mirror 17, and the monochromatic beam from the outlet slit 13 through the mirrors 18 and 19 to the mirror 20. Both of the monochromatic beams are introduced through the half mirror 21 into the light path 23 which passes the predetermined point 22. A plurality of cells 24 each containing a specimen pass continuously the predetermined point 22 in the direction at right angles to the light path 23. The monochromatic beams are transmitted through each specimen as it passes the point 22, and are detected by the detector 25. The numeral 26 shows a well known type of chopper whereby one monochromatic beams is cut off while the other is transmitted, or vice versa, and both of the monochromatic beams are simultaneously cut off for a predetermined period of time between the transmissions of the two monochromatic beams. As a result, two electrical signals corresponding to the two monochromatic beams are obtained alternately from the detector 25, while the output of the detector 25 is maintained at zero during an interval between the two different periods in which the two different types of electrical signals are produced. The two monochromatic beams have such characteristics that one of them is capable of being absorbed by the specimen contained in the cell 24 while the other is transmitted through it without being absorbed. The monochromatic beams with such characteristics are easily obtained by rotating the gratings 8 and 9 as mentioned above.

Figure 2:
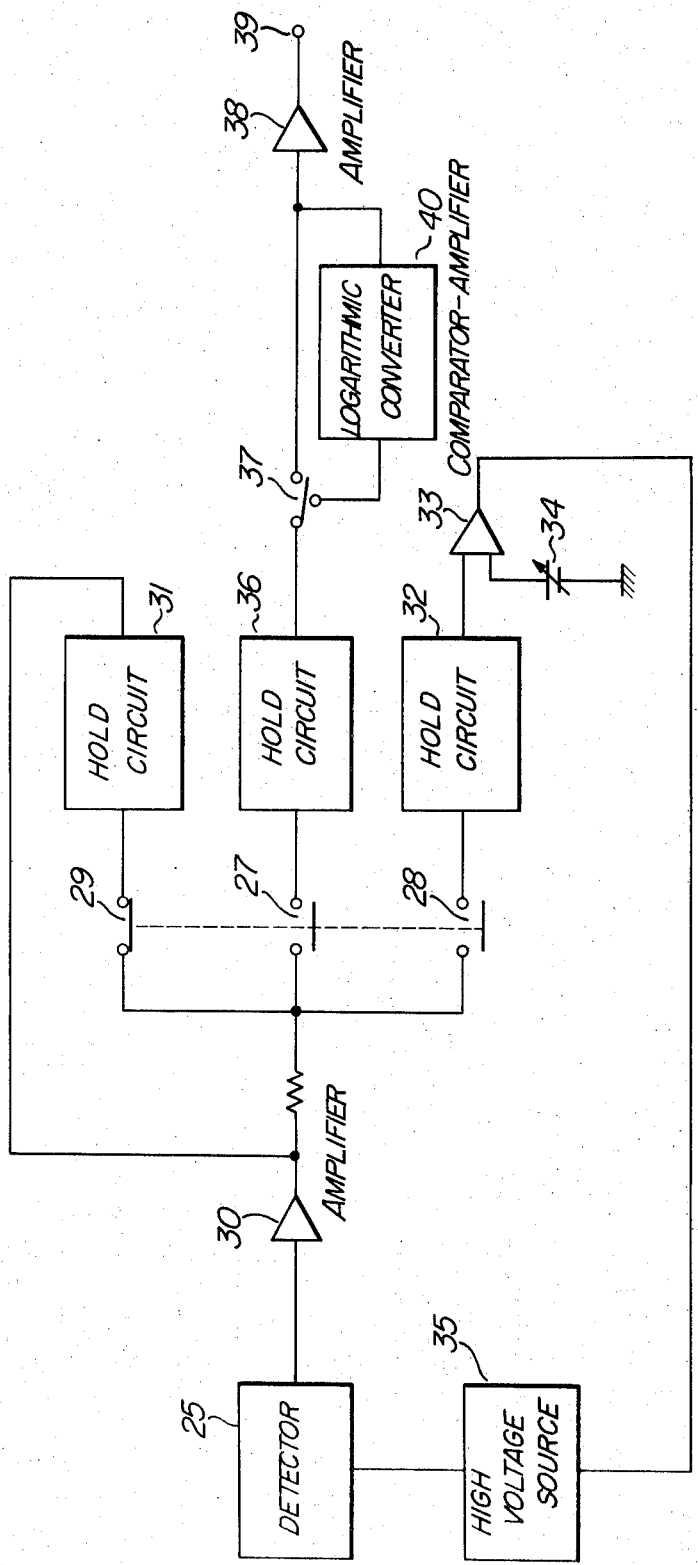
FIG. 2 is a diagram showing an electrical circuit used with an optical system of a two-wavelength spectrophotometer according to the invention.

The electrical circuit used with the optical system of the two-wavelength spectrophotometer according to the invention is shown in FIG. 2. Switches 27, 28 and 29 operate in synchronism with the chopper 26. In other words, only the switch 27 closes as long as an electrical signal corresponding to the monochromatic beam capable of being absorbed into the specimen (hereinafter called "absorption signal") is produced as an output of the detector 25. On the other hand, only the switch 28 closes while the electrical signal corresponding to the monochromatic beam incapable of being absorbed into the specimen (hereinafter called "non-absorption signal") is produced as an output of the detector 25. Also, as long as neither of the two monochromatic beams is detected by the detector 25, only the switch 29 closes. (The output of the detector 25 under this condition will be hereinafter called the "zero level signal".)

While the switch 29 is closed, the zero level signal which has passed through the amplifier 30 is fed back to the output terminal of the amplifier 30 through the switch 29 and the hold circuit 31. Under this condition, even if the switch 29 is opened, the zero level signal is held by the hold circuit 31 as it is. When the switch 28 is closed, the non-absorption signal is applied to the comparator-amplifier 33 through the amplifier 30 and the hold circuit 32 for comparison with a reference signal from a reference supply source 34. The resulting error signal is used to energize the high voltage source 35, whereby the bias voltage of the detector 25 is controlled thereby maintaining the non-absorption signal at a predetermined level. This condition is maintained by the hold circuit 32 as it is even after the switch 28 is opened. The switch 29 is closed on disappearance of the non-absorption signal, whereupon the zero level signal holding system operates again. When the switch 27 is finally closed, the absorption signal is applied through the amplifier 30 and switch 27 to the hold circuit 36 where it is rectified. The rectified signal is applied through the switch 37 to the main amplifier 38, whereby a signal representing the ratio of the absorption signal to the non-absorption signal is produced at an output terminal 39. If the logarithmic converter circuit 40 is used by the operation of the switch 37, an electrical signal representing an absorbance is produced at the output terminal 39.

Instead of analysing the specimen on the basis of the ratio between absorption and non-absorption signals as shown above, the difference between them may be utilized for the purpose of the invention.

It will be understood from the above description that according to the present invention, two monochromatic beams with different wavelengths, one capable of being absorbed by the specimen and the other incapable of being absorbed, are transmitted through a single light path, whereby the ratio or difference between them is obtained. Therefore, even if test tubes with smears, scratches or unevenesses on their surfaces are used as specimen cells and moved in succession, the measurement results are not substantially affected by the smears, scratches or unevenesses on their test tube surfaces. In addition, the specimen cells can be moved continuously without any effect on the measurement results, which highly improves the measurement efficiency. The conventional type of spectrophotometer which feeds specimens intermittently is capable of measuring only about 100 specimens per hour, whereas as many as 1,800 specimens are easily measured per hour by the spectrophotometer according to the invention without any deterioration of the reproducibility of the mesurement results. Further, since the specimens are fed continuously, no complicated feeding system is required as in the conventional instrument.

Although the division of light and selection of wavelength has been performed prior to the introduction of the specimen in the optical system of FIG. 1, the same purpose can be achieved by conducting the processes after the introduction of the specimen. The division of light and selection of wavelength, however, are better if performed prior to the introduction of the specimen because the specimen cells can be placed closer to the detector and the detector of the head-on type can be employed as such a detector. By so doing, most of the light dispersed by the specimen cells can be detected effectively.

An embodiment of the cell holder driving system according to the invention is shown in FIGS. 3 to 8. The light path 23, the predetermined position 22 and the detector 25 are the same as those shown in FIG. 1. The cell holder driving system comprises the cell holder housing 50, measuring section 51 and cell holder receiving section 52. The numeral 53 shows a plurality of cell holders each supporting a plurality of aligned specimen cells or test tubes containing specimens. The cell holders 53 are prearranged in parallel with each other in the cell holder housing 50. Among the cell holders, those along the straight line 55 (see FIG. 4) are moved to the receiving portion 52 continuously along that straight line through the measuring section 51. The cell holder that has been moved through the measuring section 51 changes its position by one step in the direction perpendicular to the straight line 55, and therefore a space large enough to accommodate one cell holder is created on the straight line 55 in the receiving section 52. On the other hand, another space sufficient to accomodate one cell holder is created on the straight line 55 in the cell holder housing 50, which space is filled by the next cell holder adjacent to the space. This process is repeated for continuous movement of the plurality of cell holders along the straight line 55 one by one through the measuring section aross the light path 23.

Figure 3:
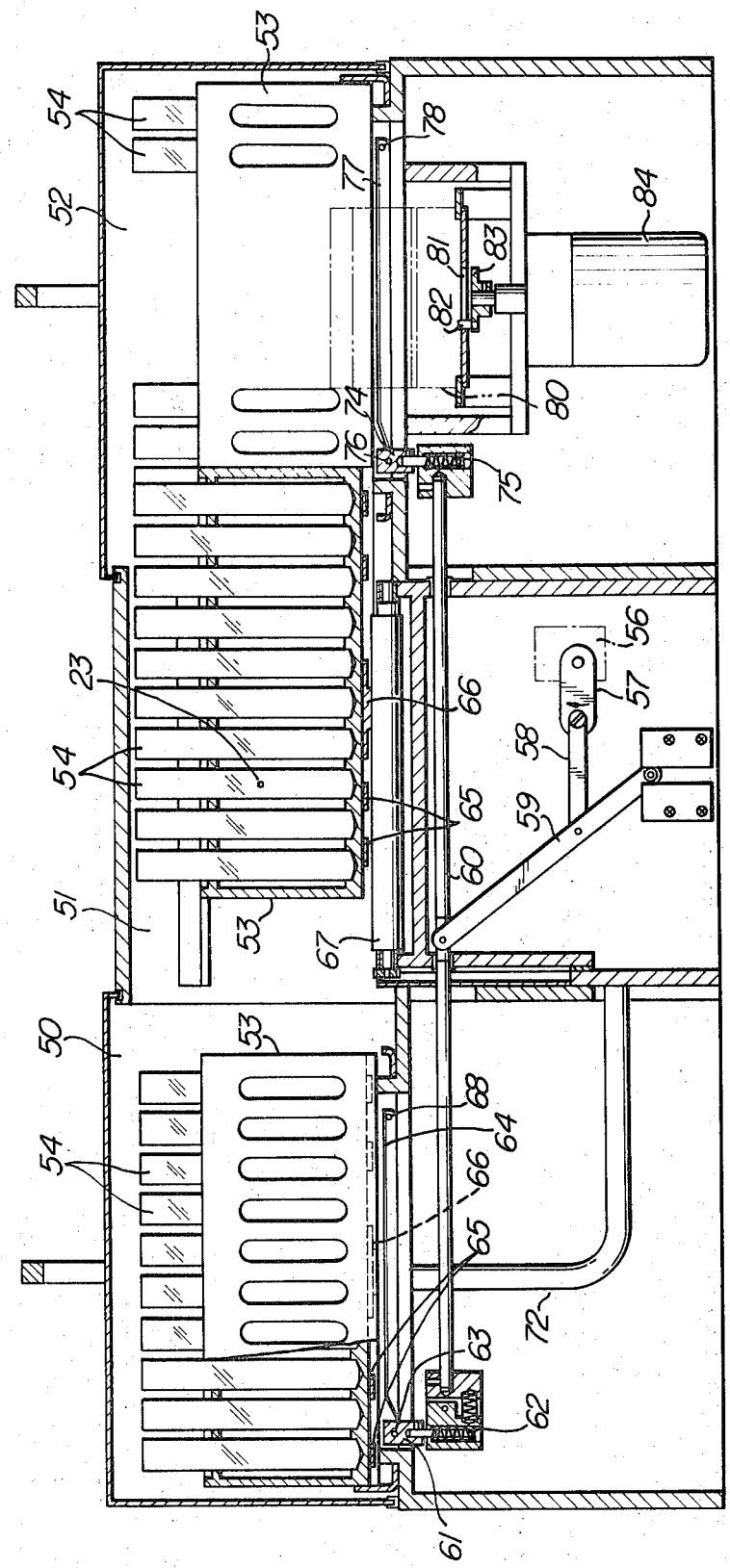
FIG. 3 is a longitudinal sectional view of a cell holder driving means for a two wavelength spectrophotometer according to the invention.
Figure 4:
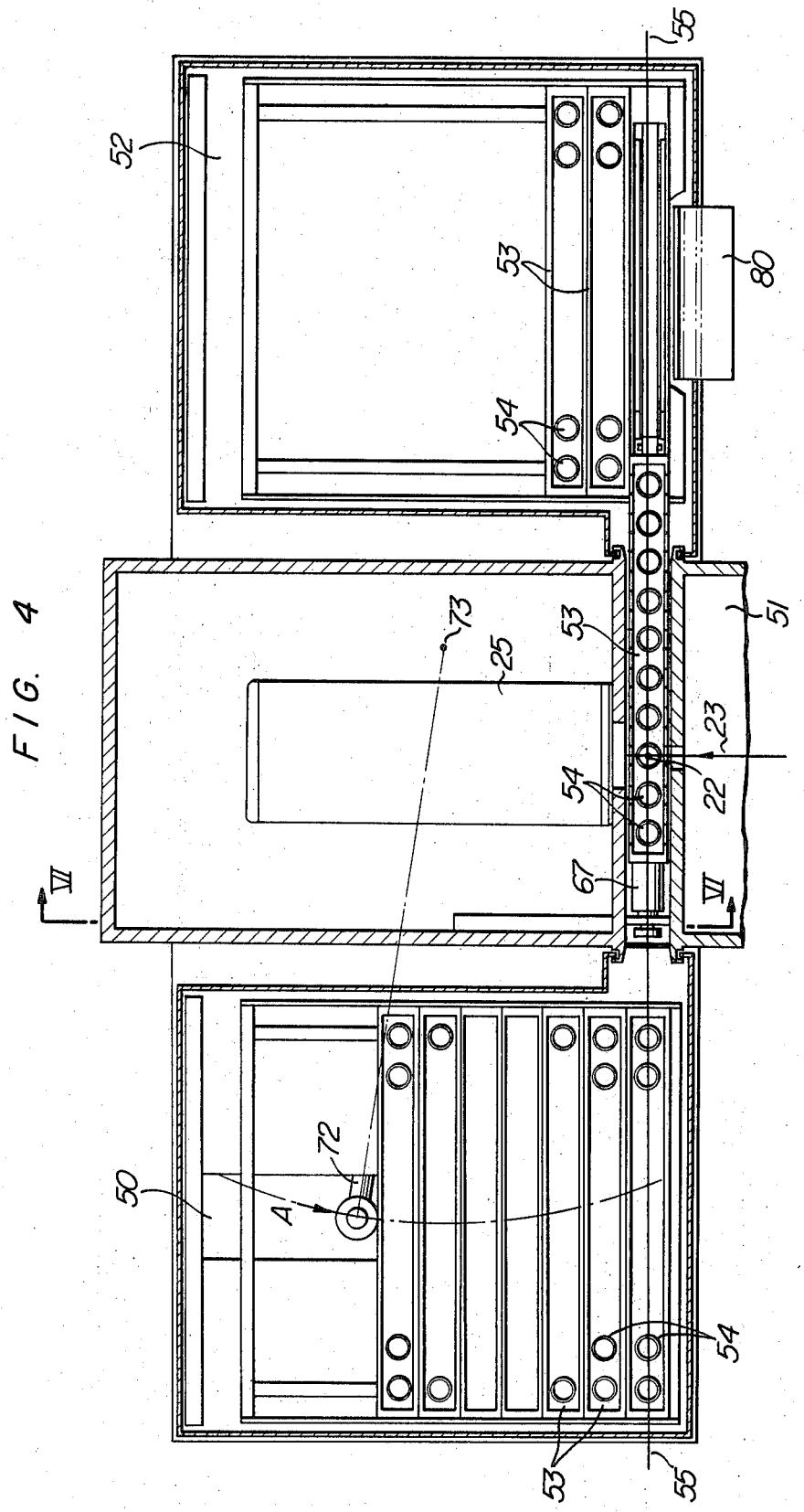
FIG. 4 is a plan of the driving means shown in FIG. 3.
Figure 5:
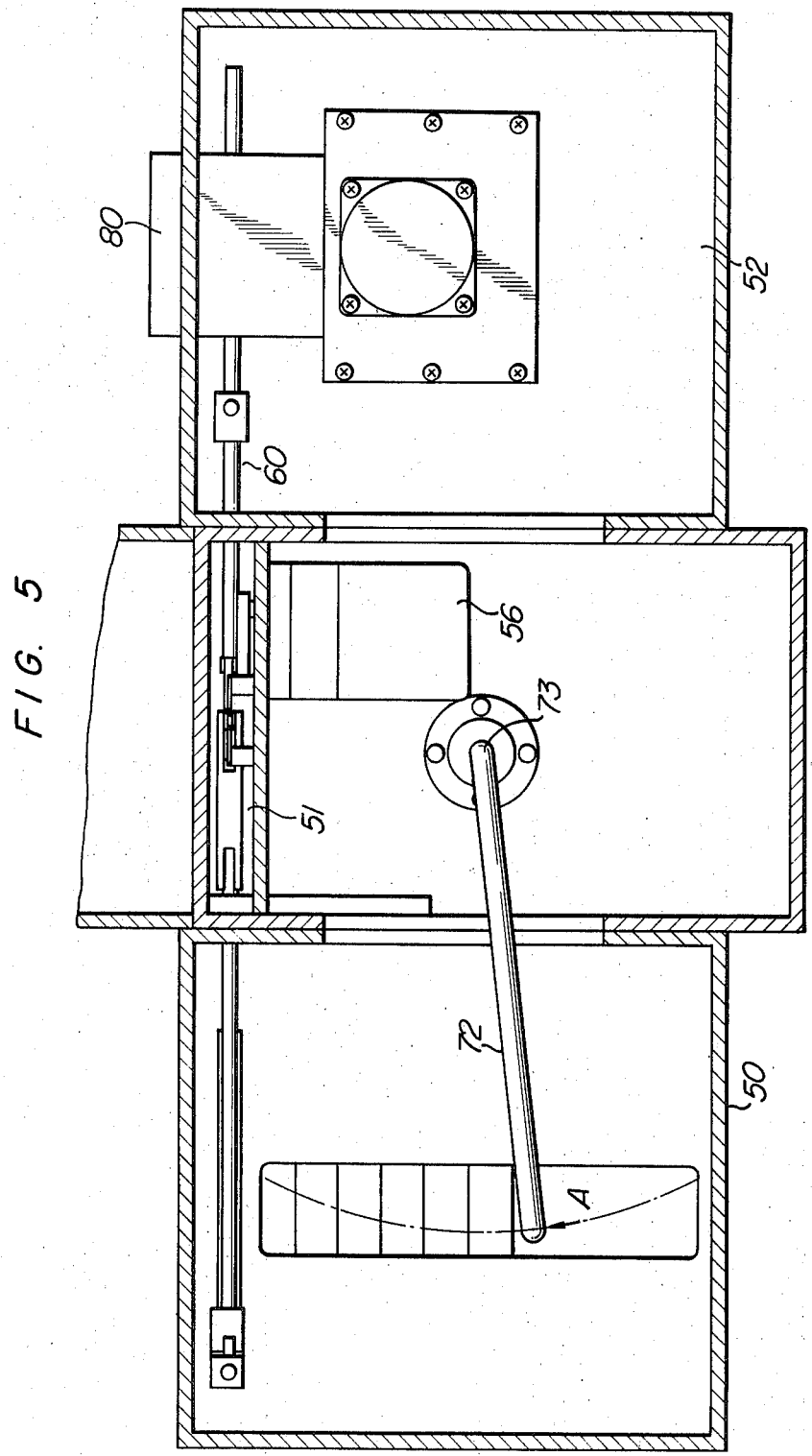
FIG. 5 is a diagram showing a bottom view of the driving means shown in FIG. 3.
Figure 6:
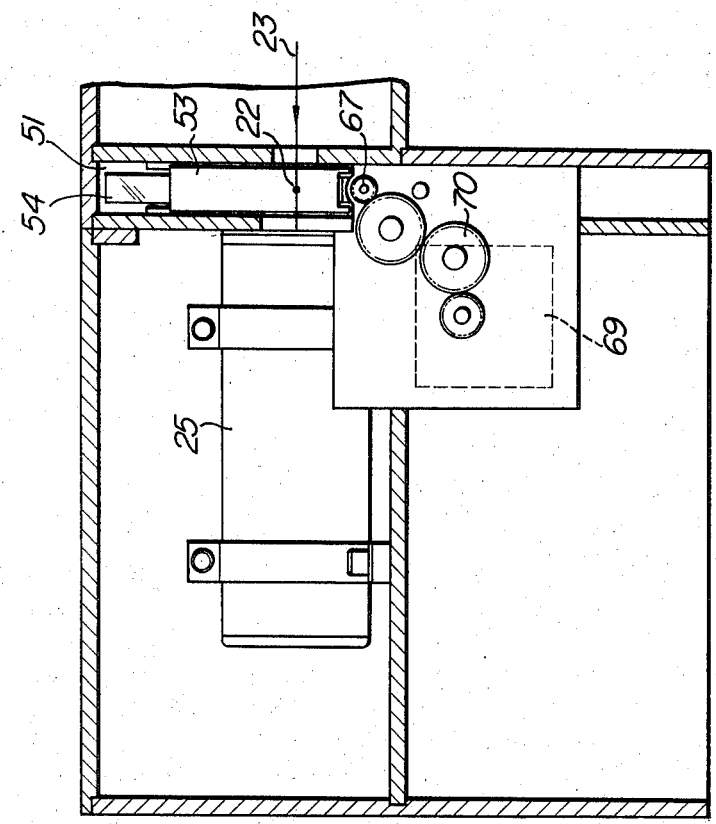
FIG. 6 shows a sectional view along the line VI—VI of FIG. 4.

FIGS. 3 and 4 show one condition in which the cell holder 53 is situated on the straight line 55 in the cell holder housing 50, a second cell holder 53 is crossing the light path 23 in the measuring section 51 and a space exists on the straight line 55 in the cell holder receiving section 52. In spite of this, the operation of the instrument of the invention will now be explained assuming that no cell holder exists in the measuring section 51 and the cell holder receiving section 52. With the continuous rotation of the motor 56, the crank arm 57 coupled thereto rotates in one direction, whereby the lower end of the lever 59 moves up and down by way of this connecting rod 58, while at the same time the shaft 60 coupled with the upper end of the lever 59 reciprocates in a direction parallel to the straight line 55. The member 61 adapted to vertical motion is pressed downwards on one end of the reciprocating shaft 60 under normal conditions and provided with a pin 63. When the reciprocating shaft 60 begins to move from its extreme left position toward the right, the pin 63 starts to climb the slope of the left end of the rail 64 rightward together with the reciprocating shaft 60. Each of the cell holders is provided with a plurality of protrusions 65 on the bottom thereof and the screw member 66 at the center of the bottom. With the upward movement of the pin 63, the member 61 on which it is fixed moves upward and engages with one of the protrusions 65 of the cell holder 53 on the straight line 55 in the cell holder housing 50, so that the cell holder 53 on the straight line 55 in the housing 50 moves rightward. At the extreme right position of the reciprocating shaft 60, the screw member 66 of the cell holder 53 engages with the feed screw 67, and the pin 63 comes off the rail 64, with the result that the member 61 is moved downward by the spring 62. When the reciprocating shaft 60 begins to move leftward, the pin 63 also moves leftward under the rail 64 and lifts the left-end slope of the rail 64 around the fulcrum 68 of the rail 64 while returning to its original position. The feed screw 67 is arranged in parallel with the straight line 55 and rotated continuously by the motor 69 shown in FIG. 6 through the gearing 70. Thus the engagement of the screw member 66 of the holder with the feed screw 67 due to the movement of the cell holder 53 on the straight line 55 in the cell holder housing 50 causes the rotation of the feed screw 67 thereby to move the holder along the straight line 55 continuously rightward. As a result, the plurality of test tubes supported by the holder move one by one across the light path 23. At the extreme right position of the reciprocating shaft 60, the screw member 66 of the cell holder 53 that has moved along the straight line 55 in the measuring section 51 comes off from the feed screw 67 and as a result the cell holder 53 is positioned almost intermediate between the measuring section 51 and the receiving section 52. When the cell holder 53 is displaced out of the straight line 55 in the cell holder housing 50, the next cell holder 53 comes in place. The entrance of the new cell holder into the receiving section 52 is effected by utilizing the turning effort of the arm 72 in the direction of A around the fulcrum 73, the turning effort being supplied by a spring (not shown). The vertically movable member 74 which has a pin 76 is pressed downward on the other end of the reciprocating shaft 60 under normal conditions.

Figure 7:
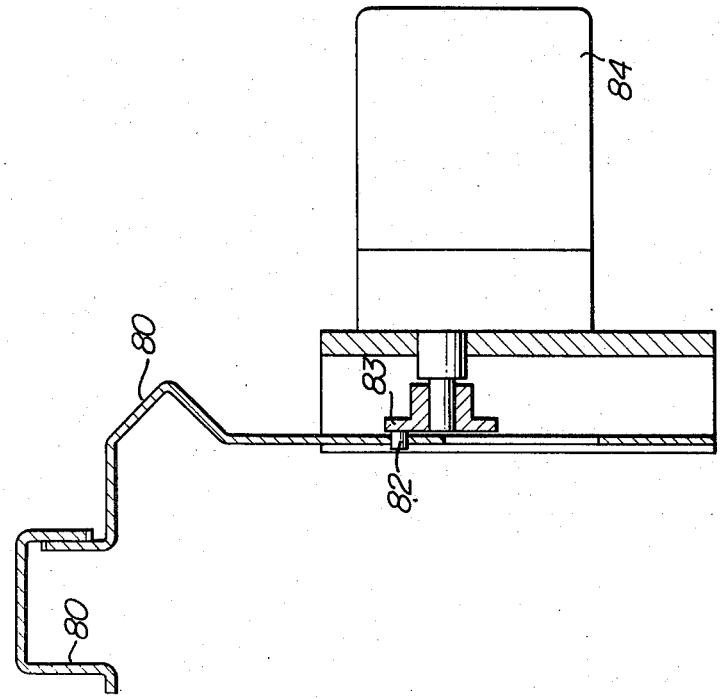
FIG. 7 is a longitudinal sectional view of a step feeding system of a cell holder.
Figure 8:
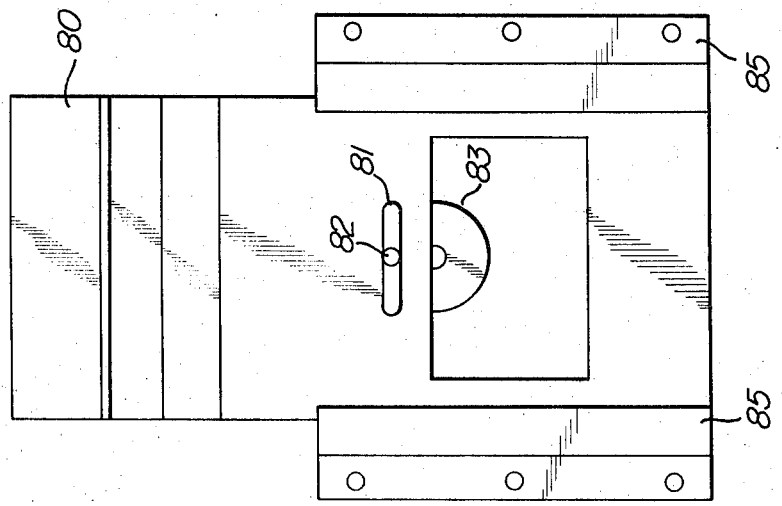
FIG. 8 is a side view of the step feeding system shown in FIG. 7.

As mentioned above, when the reciprocating shaft 60 is moved rightward to transfer to the measuring section 51 the specimen holder 53 on the straight line 55 in the cell holder housing 50, the pin 76 climbs up the left end slope of the rail 77 rightward. With the upward movement of the pin 76, the member 74 on which it is fixed moves upward. At the extreme right position of the reciprocating shaft 60, the pin 76 comes off from the rail 77 and moves downward by means of the spring 75. When the reciprocating shaft 60 begins to move leftward from its extreme right position, the pin 76 moves leftward under the rail 77 and returns to its original position while lifting the left end slope of the rail 77 around the fulcrum 78. When the reciprocatng shaft 60 moves again rightward from its extreme left end position, the cell holder 53 on the straight line 55 in the cell holder housing 50 is moved to the measuring section 51 and fed rightward along the straight line 55 by means of the feed screw 67. It is needless to say that the space created by the movement of the cell holder is filled by another cell holder adjacent to the space. When the reciprocating shaft 60 moves rightward, the member 74 also moves rightward held upward and therefore it engages with one of the protrusions 65 of the cell holder 53 almost intermediate between the measuring section 51 and the cell holder receiving section 52, thereby moving that cell holder 53 to the cell holder receiving section 52. This cell holder is moved one step in the direction at right angles to the straight line 55 out of it while the reciprocating shaft 60 is moving leftward from its extreme right end position, thus creating a space on the straight line in the receiving section which allows the next cell holder to come in. This process is repeated. The feed lever 80 reciprocates one time for each reciprocating motion of the shaft 60. The reciprocating motion of the feed lever 80, as shown in FIGS. 3, 7 and 8, is effected by the rotation of the rotary member 83 eccentrically provided with the protrusion 82 which is fitted in the slot 81 of the feed lever 80. Also, the rotation of the rotary member 83 is effected by the continuously driven motor 84, whereas the feed lever 80 reciprocates by being guided by the guide member 85.

I claim:

1. A two wavelength spectrophotometer comprising a plurality of cell holders each supporting a plurality of specimen cells each containing a specimen, means for driving said cell holders continuously with unvarying speed in such a manner that each of said specimen cells successively passes a predetermined position without hesitation means for producing light-rays with at least first and second wavelengths, the light-rays of said first wavelength being capable of being absorbed by the specimen, the light-rays of said second wavelength being substantially incapable of being absorbed by the specimen, means for directing said light-rays to a predetermined position in such a manner that said light-rays of different wavelength are transmitted through each specimen cell alternately passing through said predetermined position, photoelectric converter means for detecting the transmitted light-rays, means for selecting said first and second wavelengths in such a manner that the light-rays to be detected by the photoelectric converter means have only said first and second wavelengths, respectively, and two electrical signals corresponding only to said respective two wavelengths are picked up from said photoelectric converter means, and means for producing an electrical signal representing the result of the comparison between said two electrical signals.

2. A two-wavelength spectrophotometer according to claim 1, in which said plurality of specimen cells are held on a straight line within said cell holder, said cell holder driving means comprising a feed screw in parallel with said straight line and means for continuously rotating said feed screw, said feed screw engaging with said cell holder, whereby said plurality of specimen cells pass successively through said predetermined position one by one.

3. A two-wavelength spectrophotometer comprising a plurality of cell holders each holding a plurality of specimen cells, means for driving said cell holders continuously with unvarying speed in such a manner that each of said specimen cells passes successively a predetermined position without hesitation, means for producing light, means for dividing said light into two beams, chopper means for introducing said two beams alternately to a single path passing through said predetermined position, means for selecting the wavelengths of said two beams to convert said two beams into first and second monochromatic beams respectively in such a manner that said monochromatic beams are alternately transmitted through each of the specimen cells passing through said predetermined position, said first monochromatic beam being capable of being absorbed by said specimen, said second monochromatic beam being incapable of being absorbed by said specimen, photoelectric converter means synchronized with said chopper means for converting said transmitted monochromatic beams into two electrical signals separated in time, and means for producing a signal representing one of the ratio and difference between said two electrical signals.

4. A two-wavelength spectrophotometer according to claim 3, in which said photoelectric converter means comprises a detector of the head-on type and said detector is placed close to said predetermined position.

5. A two-wavelength spectrophotometer according to claim 3, in which said plurality of specimen cells are held on a straight line within said cell holder, said cell holder driving means comprising a feed screw in parallel with said straight line and means for continuously rotating said feed screw, said feed screw engaging with said cell holder, whereby said plurality of specimen cells pass successively through said predetermined position one by one.

6. A two-wavelength spectrophotometer comprising a pluraliy of cell holders each holding a plurality of specimen cells each containing a specimen, means for continuously driving said cell holders with unvarying speed in such a manner that said specimen cells pass a predetermined position successively one by one without hesitation, means for producing light, means for dividing said light into two beams, means for introducing said two beams alternately to a single light path passing said predetermined position, means for selecting first and second wavelengths to convert said two beams into two monochromatic beams of said first and second wavelengths respectively, said first monochromatic beams being capable of being absorbed by said specimen, said second monochromatic beam being incapable of being absorbed by said specimen, means for alternately transmitting said first and second monochromatic beams through each specimen cell passing through said predetermined position, detector means for converting each of said monochromatic beams into an electrical signal, and means for producing an electrical signal representing the ratio between said two electrical signals.

7. A two-wavelength spectrophotometer comprising a plurality of cell holders each holding a plurality of aligned specimen cells each containing a specimen, means for moving said cell holders one by one to a first position on a straight line passing through a predetermined position, means for continuously transporting said cell holder with unvarying speed at the first position through said predetermined position along said straight line without hesitation, means for transporting said transported cell holder to a second position on said straight line along said straight line, means for moving in a direction at right angles to said straight line said cell holder transported to said second position, means for producing light means for dividing said light into two beams, means for introducing said beams to a single light path passing through said predetermined position at a right angle to said straight line, means for selecting first and second wavelengths to convert said two beams into two monochromatic beams of said first and second wavelengths, said first monochromatic beam being capable of being absorbed by said specimen, said second monochromatic beam incapable of being absorbed by said specimen, said monochromatic beams being transmitted through each specimen passing through said predetermined position, photoelectric converter means for converting each of said monochromatic beams into an electrical signal, and means for producing an electrical signal representing the result of the comparison between said two electrical signals.

8. A two-wavelength spectrophotometer according to claim 7, in which said photoelectric converter means comprises a detector of the head-on type and said detector is placed close to said predetermined position.

9. A two-wavelength spectrophotometer according to claim 8, further comprising means for logarithmically converting said electrical signal representing the result of the comparison between said two electrical signals.

10. A two-wavelength spectrophotometer according to claim 9, in which each of said specimen cells comprises a test tube.

* * * * *